Figure 1:
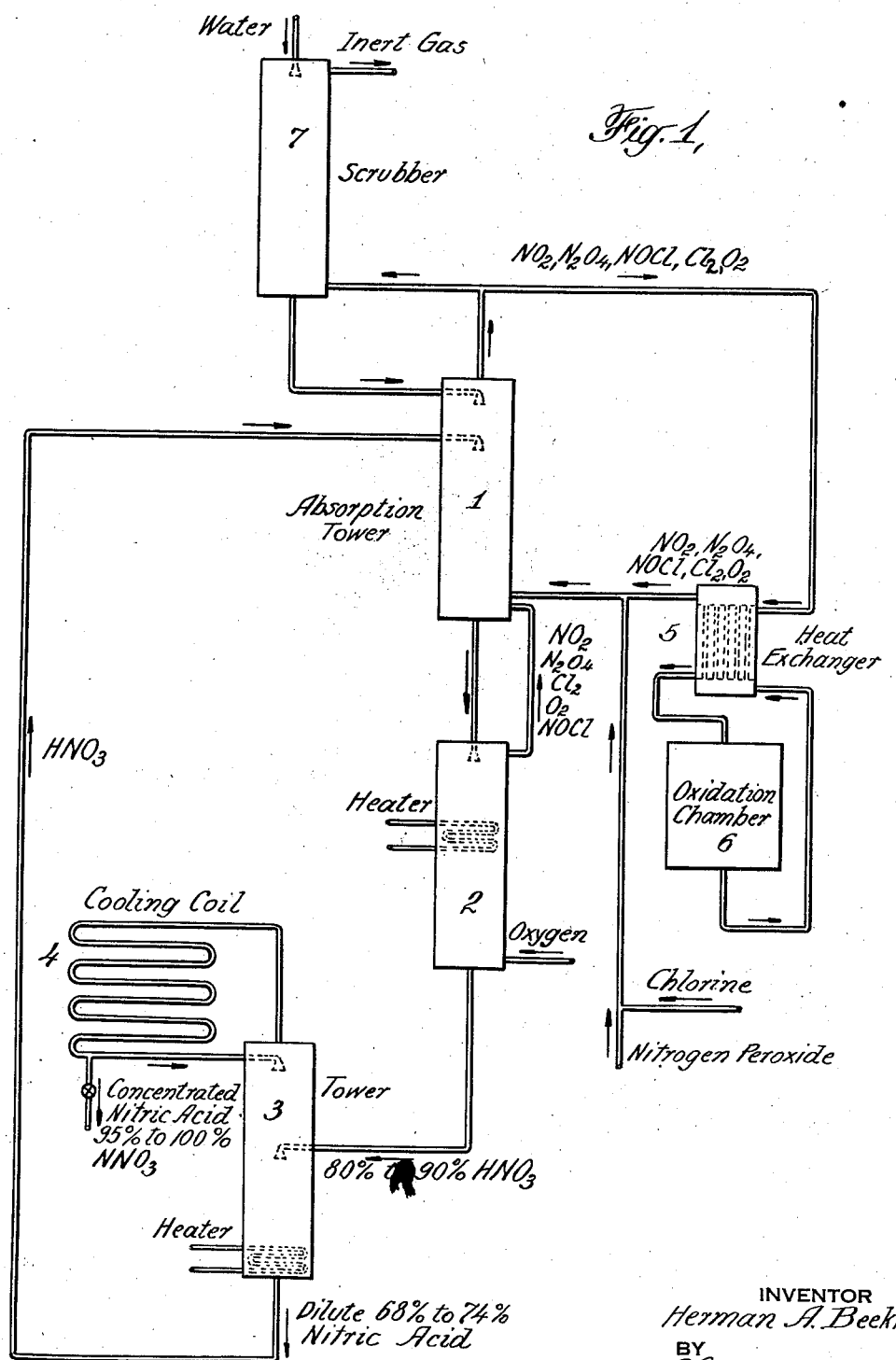

Jan. 2, 1940.  H. A. BEEKHUIS, JR  2,185,580
PROCESS FOR THE PRODUCTION OF NITRIC ACID
Filed Aug. 20, 1938  2 Sheets-Sheet 2

INVENTOR
Herman A. Beekhuis Jr.
BY
Charles W. Brown
ATTORNEY

Patented Jan. 2, 1940

2,185,580

UNITED STATES PATENT OFFICE 2,185,580

PROCESS FOR THE PRODUCTION OF NITRIC ACID

Herman A. Beekhuis, Jr., Petersburg, Va., assignor to The Solvay Process Company, New York, N. Y., a corporation of New York Application August 20, 1938, Serial No. 225,872

11 Claims. (Cl. 23—160)

This invention relates to a process for the production of concentrated nitric acid by the reaction of nitrogen peroxide with water.

Numerous processes have heretofore been proposed for reacting nitrogen peroxide ($NO_2$ or $N_2O_4$) with water to form nitric acid. The reaction may be expressed by the equation $$\text{I} \qquad 3NO_2 + H_2O = NO + 2HNO_3$$

When oxygen is also present, it may oxidize the nitric oxide (NO) to nitrogen peroxide which may then react with the water to form nitric acid. By repeated reaction of the nitrogen peroxide with the water and oxidation of the nitric oxide to reform nitrogen peroxide, substantially all of the nitrogen present in the nitrogen peroxide originally introduced into the process eventually may be converted into nitric acid in accordance with the equation $$\text{II} \qquad 2NO_2 + H_2O + 0.5O_2 = 2HNO_3$$

The reaction of Equation I above is an equilibrium reaction. Nitric acid and nitric oxide also react to form water and nitrogen peroxide. For a given concentration of nitrogen peroxide and of aqueous nitric acid in contact with each other there is a definite partial pressure of nitric oxide. A decrease in the concentration of nitrogen peroxide or an increase in the concentration of the nitric acid favors the reaction of the nitric acid and nitric oxide to form water and nitrogen peroxide. For any given concentration of the nitrogen peroxide in the reaction mixture there is a definite limitation to the concentration of nitric acid which may be formed due to the increase in concentration of the nitric oxide formed as the reaction proceeds.

With oxygen present as in carrying out the process of Equation II above, it will act to oxidize NO to $NO_2$ in accordance with the following equation $$\text{III} \qquad 2NO + O_2 = 2NO_2$$

This reaction also, however, is an equilibrium reaction, nitrogen peroxide dissociating to form nitric oxide and oxygen. A decrease in the concentration of the nitric oxide favors the dissociation of the nitrogen peroxide. The reaction of nitric oxide with oxygen to form nitrogen peroxide is moderately rapid so long as the concentration of the nitric oxide corresponds to about 0.1 to 1 atmosphere partial pressure of NO. For low concentrations of nitric oxide, however, for example with nitric oxide partial pressures of 0.01 atmosphere or lower, reaction with oxygen is slow.

Although no special difficulty is involved in obtaining nitric acid up to about 60% strength from nitrogen peroxide and oxygen, since this involves partial pressures of NO in equilibrium with the nitric acid of above about 0.01 atmosphere, when it is attempted to produce directly an acid of greater strength, special means must be used to increase the otherwise very low rate of reaction between the nitric oxide and oxygen due to the low nitric oxide concentration is equilibrium with the relatively highly concentrated nitric acid.

It is an object of this invention to provide a process for the reaction of nitrogen peroxide with the water content in a nitric acid solution whereby the reaction to form nitric acid may be promoted and the reverse reaction of nitric acid with nitric oxide may be inhibited. Thus the direct production of relatively concentrated nitric acid by absorption of nitrogen peroxide in water or dilute nitric acid may be facilitated.

I have discovered that when nitrogen peroxide is reacted with water contained in relatively concentrated nitric acid solutions in the presence of chlorine, nitrosyl chloride is formed and may be evolved from the solution substantially free from nitric oxide. This reaction may be expressed by the equation $$\text{IV} \qquad 3NO_2 + 0.5Cl_2 + H_2O = 2HNO_3 + NOCl$$

That this reaction will take place and nitrosyl chloride may be evolved from the concentrated nitric acid is surprising, since gaseous nitric oxide and chlorine react very slowly at ordinary atmospheric temperatures at which the reaction of nitrogen peroxide to form nitric acid is carried out; in fact, they react more slowly than does nitric oxide and oxygen. Furthermore, chlorine is relatively insoluble in concentrated nitric acid solution and thus the reaction of the chlorine with the nitric oxide formed from nitrogen peroxide and water would not be expected to take place. Despite this, however, I have discovered the chlorine does in fact appear to dissolve in the concentrated nitric acid sufficiently rapidly to oxidize the nitric oxide to nitrosyl chloride and this inhibits the reaction of the nitric oxide with the nitric acid.

As noted above, the oxidation of nitric oxide in concentrations corresponding to partial pressures of NO below about 0.01 atmosphere is so slow as to be a serious handicap in the production of concentrated nitric acid by the direct absorption of nitrogen peroxide in aqueous nitric acid. However, with chlorine present in accordance with the process of this invention, I have discovered it is feasible to operate under conditions which correspond to a nitric oxide concentration equivalent to a partial pressure of NO below 0.01 atmosphere, for example 0.0003 atmosphere or even less, and a highly concentrated nitric acid may readily be produced by the direct absorption of nitrogen peroxide in the presence of chlorine. The nitric acid thus obtained contains chlorine (free and combined) which may, however, be readily stripped from the concentrated nitric acid by heating the acid, preferably while passing a gas such as oxygen in contact with the heated acid. Chlorine, chiefly in the form of nitrosyl chloride, and some nitrogen peroxide gas my thus be evolved from the nitric acid and a pure concentrated nitric acid product obtained.

In carrying out the process of this invention for the production of nitric acid, nitrogen peroxide is reacted with an aqueous nitric acid containing substantially 70 parts or more $HNO_3$ to 30 parts $H_2O$ (corresponding to substantially 70% or stronger nitric acid solution) in the presence of free chlorine to form a more concentrated nitric acid containing at least 70 parts $HNO_3$ to 30 parts $H_2O$. The reaction is carried out in a reaction mixture containing a concentration of nitrogen peroxide and a nitric acid for which the equilibrium partial pressure of nitric oxide is below 0.01 atmosphere. The concentration of chlorine in a nitric acid containing 70 parts or more $HNO_3$ to 30 parts $H_2O$ formed by reaction of nitrogen peroxide and chlorine is a measure of the influence of the chlorine upon the reaction in maintaining a low partial pressure of nitric oxide in the reaction mixture. Accordingly, in carrying out the process of this invention the reaction mixture contains sufficient free chlorine to reduce the partial pressure of the nitric oxide to below the equilibrium partial pressure of NO in the absence of chlorine and to form a nitric acid containing more than 0.5%, and preferably about 1% or more total chlorine (calculated as HCl) which is present in the acid as free chlorine, nitrosyl chloride and hydrogen chloride.

The chlorine may be present in the liquid phase of the reaction mixture, in the proportions of, for example, 1 mol chlorine to 5 to 100 mols of total nitrogen peroxide (present both as $NO_2$ and $N_2O_4$), preferably 1 mol chlorine to 15 to 30 mols total nitrogen peroxide. Since the distribution of the chlorine and nitrogen peroxide between the gas and liquid phases of the reaction mixture differs, the above proportions of 1 mol chlorine to 5 to 100 mols and to 15 to 30 mols nitrogen peroxide in the liquid phase correspond to 1 mol chlorine to 1 to 20 mols and to 3 to 6 mols, respectively, of nitrogen peroxide in the gas phase of the reaction mixture. The partial pressure of nitrogen peroxide in the reaction mixtures should be more than 0.1 atmosphere. Nitrogen peroxide and chlorine in contact with the nitric acid will contain nitrosyl chloride and this or other gases, for example, oxygen and nitrogen, may be present in a nitrogen peroxide-chlorine gas initially passed into contact with the aqueous acid. It is preferred, however, that the gas initially contacted with aqueous acid containing 70% or more $HNO_3$ contain about 50% to about 85% total nitrogen peroxide.

The reaction mixture of nitric acid, nitrogen peroxide and chlorine may be prepared by mixing under pressure an aqueous nitric acid or water and liquid nitrogen peroxide and chlorine in proportions such that either initially or after reaction of a portion of the water with the nitrogen peroxide the reaction mixture contains aqueous nitric acid containing about 70 parts or more $HNO_3$ to 30 parts $H_2O$, nitrogen peroxide and chlorine in concentrations suitable for the desired further reaction of the water in the aqueous acid with the nitrogen peroxide in accordance with the process of this invention. The reaction mixture may be prepared by intimately contacting aqueous nitric acid containing substantially 70% or more $HNO_3$ with gaseous nitrogen peroxide and chlorine. In this case also the aqueous nitric acid initially may contain much less than 70% $HNO_3$ and by reaction with part of the nitrogen peroxide and chlorine attain a concentration of substantially 70% and the reaction of this acid and the nitrogen peroxide and chlorine then continue to form a 70% or stronger nitric acid under the conditions herein described for carrying out the process of this invention.

The reaction of the aqueous nitric acid, nitrogen peroxide and chlorine may be carried out at a wide range of temperatures, for example, from 0° C. to about 10° C. below the boiling point of water at the pressure under which the reaction mixture is maintained. It is preferred, however, to maintain the reacting materials at a temperature of about 30° C. to 70° C. The concentrated nitric acid product obtained may be heated under atmospheric pressure to a temperature above 50° C. to free it of chlorine and chlorides and their evolution from the acid may be facilitated by both heating the acid and passing in contact with it an inert gas such as oxygen.

As has already been indicated, in contacting a gas containing nitrogen peroxide and chlorine with an aqueous nitric acid solution to react these materials and to form a nitric acid containing 70% or more $HNO_3$, numerous factors affect the reaction, i. e., concentration of nitrogen peroxide, chlorine and nitrosyl chloride in the gas, ratio of water to nitric acid in the liquid and temperature. The process of this invention may be carried out to form a nitric acid containing 70% or more $HNO_3$ by contacting a gas containing nitrogen peroxide and chlorine with substantially 70% or stronger aqueous nitric acid under conditions such that

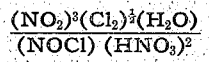

is at least equal to the antilog (10) of (0.02T—6.6) where: ($NO_2$), ($Cl_2$) and (NOCl) are the partial pressures in atmospheres of nitrogen peroxide as $NO_2$, chlorine and nitrosyl chloride in the gas with which the 70% or stronger nitric acid formed by reaction of the nitrogen peroxide with a weaker acid is last contacted; T is the temperature in degrees absolute of the reacting gas and nitric acid where the acid is last contacted with the gas; and

is the ratio of the water vapor pressure to the square of the nitric acid vapor pressure (in atmospheres) at temperature T over a nitric acid-water solution containing the same proportions of $HNO_3$ and $H_2O$ as the aqueous nitric acid containing substantially 70 parts or more $HNO_3$ to 30 parts $H_2O$ which initially contacts with gas containing nitrogen peroxide and chlorine to react therewith to form 70% or stronger nitric acid in accordance with this invention.

Of the total nitrogen peroxide present in the reaction mixture only that present as NO2 is included in the above formula. From the partial pressure of total nitrogen peroxide in the gas, the partial pressure of NO2 may be calculated from the formula:

$$\frac{(N_2O_4)}{(NO_2)^2} = \text{antilog}_{(10)} \text{ of } (9.75 - 0.03T)$$

where (N2O4) and (NO2) represent the partial pressures of the respective gases and T is the temperature in degrees absolute of the gas containing these two constituents.

This invention is of particular value in the production of highly concentrated nitric acid containing, for example, 95% up to 100% HNO3 from gases containing nitrogen peroxide. As pointed out above, relatively dilute aqueous nitric acid solutions may be obtained by absorption of nitrogen peroxide in water or aqueous nitric acid solutions, but to make acids of a high strength requires special provisions to increase the rate of oxidation of the nitric oxide; nor may aqueous acids containing less than 70% HNO3 which may be prepared by absorption of nitrogen peroxide be distilled to produce highly concentrated acids. Nitric acid and water form a constant boiling mixture containing about 68% HNO3 so that no acid of a higher concentration than 68% may be obtained by distilling a weaker acid. This invention, therefore, comprises a process wherein a nitric acid containing at least 70% HNO3 is formed by reaction of nitrogen peroxide with water in an aqueous nitric acid, and this relatively concentrated acid is then fractionally distilled to yield a dilute nitric acid distillate and a highly concentrated nitric acid product, which may contain upwardly of 95% to 100% HNO3. An embodiment of this aspect of the invention comprises reacting nitrogen peroxide with an aqueous nitric acid containing, say, 68% to 74% HNO3 in the presence of chlorine until the acid contains about 80% to 90% HNO3. This more concentrated acid is fractionally distilled to obtain a relatively dilute nitric acid as a residue and a concentrated nitric acid containing about 95% or up to 100% HNO3 as a distillate.

For a further understanding of this invention reference is had to the following detailed description of processes for the production of a concentrated nitric acid which are illustrated in the accompanying drawings. In the drawings—

Figure 2:
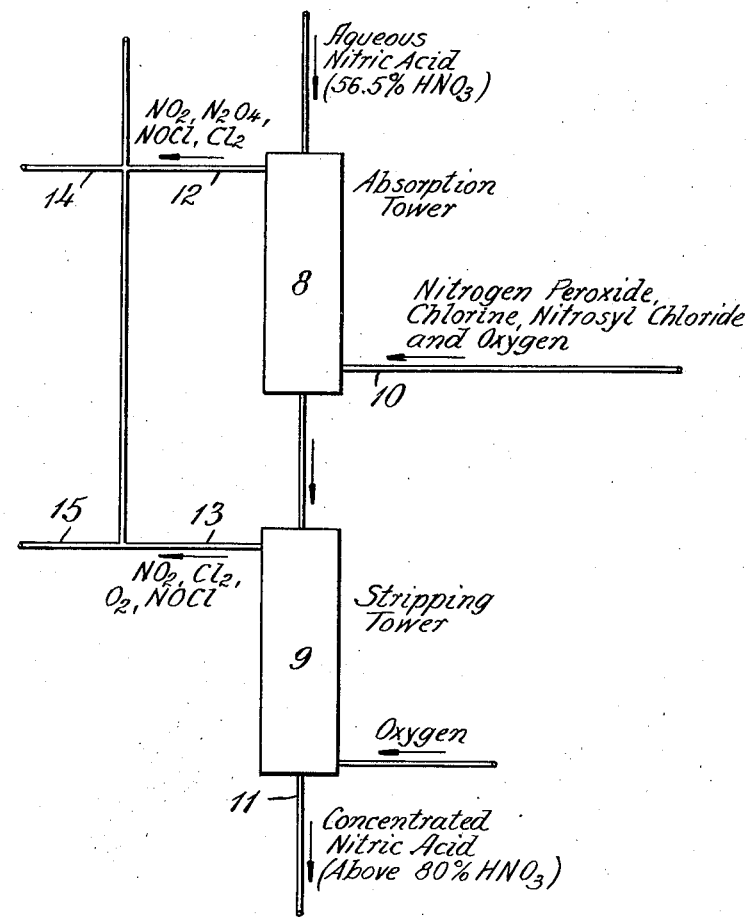

Fig. 1 shows a process for the reaction of nitrogen peroxide, chlorine and water to form a concentrated nitric acid and nitrosyl chloride, and Fig. 2 illustrates a modification of the process of Fig. 1.

Referring to Fig. 1 of the drawings, the numeral 1 indicates an absorption tower into the upper portion of which an aqueous nitric acid containing, for example, about 68% to 74% HNO3 is introduced. A mixture of nitrogen peroxide and chlorine is introduced into the bottom of tower 1 and is passed upwardly through the tower in contact with the nitric acid descending therethrough at a temperature of, for example, about 30° C. There flows off from the bottom of the tower a relatively concentrated aqueous nitric acid solution containing some dissolved nitrogen peroxide and chlorine, particularly chlorine combined as nitrosyl chloride. The nitric acid may also contain chlorine in combination as hydrochloric acid. This acid solution is introduced into the top of tower 2 which operates as a desorber. Tower 2 is provided with a heater to heat the nitric acid descending through the tower to a temperature within the range of 50° to 100° C. Oxygen is also introduced into the bottom of the tower and passed upwardly in contact with the descending heated nitric acid. The gases evolved from the acid in the desorber, together with oxygen introduced thereinto pass from the top of the desorber into the bottom of absorption tower 1 where they mingle with the nitrogen peroxide gas passed into this tower. These gases may contain nitrogen peroxide, chlorine, nitrosyl chloride and oxygen.

Instead of heating the nitric acid in desorber 2 and treating it at an elevated temperature with a relatively small amount of oxygen gas as described above, the acid from absorption tower 1 may be treated in desorber 2 by means of air or other gas inert towards nitric acid passed through the desorber in amount sufficient to remove from the acid at ordinary atmospheric temperatures nitrogen peroxide, nitrosyl chloride and chlorine contained therein. In thus treating the acid the gas leaving the desorber will contain relatively small proportions of nitrogen peroxide, nitrosyl chloride and chlorine which may be recovered, if desired, by absorption in water or the gas leaving the desorber may be discharged without further treatment.

The relatively dilute nitric acid introduced into absorption tower 1 is treated with the gases containing nitrogen peroxide and chlorine in such amount that the nitric acid solution after treatment in desorber 2 contains from 80% to 90% HNO3. This relatively concentrated nitric acid is introduced into the mid-portion of a tower 3, the bottom of which is provided with a heater. In this tower the entering nitric acid is passed downwardly in contact with relatively dilute nitric acid vapors to evolve nitric acid and water vapors from the entering nitric acid and the mixture of nitric acid and water vapors pass upwardly through the tower in contact with refluxed nitric acid, and thence to a condenser 4 where they are condensed to form nitric acid. A portion of this condensate is returned to the top of tower 3 as a nitric acid reflux. The amount of reflux is so regulated that upon condensing the nitric acid vapors leaving the top of the tower, a nitric acid of about 95% to 100% HNO3 is formed. This relatively concentrated nitric acid, as noted above, is in part returned as reflux to the top of tower 3 and the remainder is withdrawn as a concentrated nitric acid product of this process. The relatively dilute nitric acid which passes downwardly into the bottom of tower 3 is heated to provide the nitric acid and water vapors for treatment of the more concentrated acid introduced into the mid-portion of this tower from desorber 2. Sufficient vapors are evolved from this nitric acid in the bottom of tower 3 so that it contains from 68% to 74% HNO3 which is withdrawn from the bottom of the tower and is returned to the upper portion of absorption tower 1 for treatment with the gas containing nitrogen peroxide and chlorine.

The gases from the top of absorption tower 1 contain nitrogen peroxide and nitrosyl chloride together with some chlorine and oxygen. These gases are passed through a heat exchanger 5 and thence to an oxidation chamber 6, where nitrosyl chloride is oxidized to nitrogen peroxide and chlorine by means of the oxygen contained in the gas. The hot gaseous products of this oxidation treatment pass through heat exchanger 5 serving to preheat the incoming gas containing nitrosyl chloride and are then introduced into the nitrogen peroxide gas on its way to absorption tower 1. A portion of the gases from the top of absorption tower 1 are continuously withdrawn to a scrubber 7 where they are washed with water to absorb the nitrogen peroxide, nitrosyl chloride and chlorine, as well as any nitric acid which may be present in this withdrawn gas. The unabsorbed inert gases are vented from the top of scrubber 7 while the dilute aqueous solution from the bottom of scrubber 7 is introduced into the top of absorption tower 1.

In carrying out the process described above and illustrated in the drawing, the proportions of water introduced into scrubber 7 and thence into absorption tower 1 and of nitrogen tetroxide gas introduced into the bottom of absorption tower 1 are such as to form the desired relatively concentrated nitric acid of 80% to 90% $HNO_3$ leaving tower 1 and the 95% to 100% acid from tower 3. Since theoretically all of the chlorine gas present in the nitrogen peroxide gas introduced into the bottom of absorption tower 1 may be recovered as nitrosyl chloride, which may be oxidized to nitrozen peroxide and chlorine and reintroduced into absorption tower 1, once the desired proportion of chlorine has been introduced into the cyclic system in which the procedure described above is carried out, no further addition of chlorine is required except that necessary to make up for the chlorine losses from the system, for example, that lost with the inert gas withdrawn from scrubber 7 or the unavoidable losses of materials always encountered in the actual carrying out of chemical processes. The oxygen required for substantially complete reaction of the nitrogen peroxide with the water is introduced into the bottom of desorber 2 and thence passes to obsorption tower 1. In the continuous operation of the process described above the nitrogen peroxide and oxygen are introduced into the system in the proportions of about 4 mols of nitrogen peroxide for each 1 mol of oxygen, together with the required amount of make-up chlorine. As illustrative of the approximate composition of the gases in the process described above, it may be said that the gas leaving absorption tower 1 passing to heat exchanger 5 may contain about 0.5 mol of nitrogen peroxide to 1.5 mols nitrosyl chloride to 0.5 mol chloride to 1 mol oxygen. The gas after oxidation of nitrosyl chloride in oxidation chamber 6 may contain 1.5 mols nitrogen peroxide to 0.5 mol nitrosyl chloride to 1 mol chlorine to 0.5 mol oxygen. To this gas there is added about 2 mols of nitrogen peroxide for every 1.5 mols of nitrogen peroxide in the gas from the oxidation chamber 6, and about 0.5 mol oxygen is introduced into the bottom of desorber 2 for every 2 mols of nitrogen peroxide introduced into the gas leaving oxidation chamber 6. These ratios are for the nitrogen peroxide calculated as $NO_2$. If desired, the distillation and rectification of nitric acid in tower 3 may be carried out under a reduced pressure below atmospheric. The acid from desorber 2 may also, if desired, be treated with concentrated sulfuric acid to obtain a more concentrated nitric acid (95% to 100% $HNO_3$) instead of being subjected to the distillation treatment described above.

In carrying out the process illustrated in Fig. 1 and described above, the concentrated nitric acid flowing from the bottom of absorption tower 1 will contain about 1% chlorine (both free and combined), calculated as HCl. Substantially all of this chlorine content of the solution will be evolved as nitrosyl chloride and chloride in heating the acid in tower 2.

Referring to Fig. 2, which illustrates a second procedure operating in accordance with this invention, absorption tower 8 and stripping tower 9 correspond to towers 1 and 2 of the apparatus of Fig. 1. A gas of the following composition in per cent by volume is passed at one atmosphere through pipe 10 into the bottom of tower 8.

|  | Percent |
|---|---|
| Total nitrogen peroxide | 62.5 |
| Chlorine | 13.5 |
| Nitrosyl chloride | 6.5 |
| Oxygen | 17.4 |

To the top of tower 8 there is supplied 56.5% nitric acid which flows downwardly through the tower in contact with the ascending gases. The acid and gases in tower 8 are maintained at about 40° C. A nitric acid of more than 80% $HNO_3$ strength (more than 80 parts $HNO_3$ to every 20 parts $H_2O$) containing dissolved $NO_2$ and chloride equivalent to about 1% HCl is withdrawn from the bottom of tower 8 and is passed into the top of tower 9 in which it is heated and treated with oxygen to evolve the chlorine content of the acid. A concentrated nitric acid containing above 80% $HNO_3$ flows from the bottom of tower 9 through pipe 11.

In carrying out the process of this example, the partial pressures in the gas introduced into the bottom of tower 8 (i. e., the gas with which the acid containing above 80% $HNO_3$, formed by reaction of the nitrogen peroxide with weaker acid, is last contacted) will be:

|  | Atmosphere |
|---|---|
| Nitrogen peroxide | 0.31 |
| Nitrogen tetroxide | 0.23 |
| Chlorine | 0.166 |
| Nitrosyl chloride | 0.08 |
| Oxygen | 0.214 |
|  | 1.000 |

The temperature of the reacting gas and liquid at the bottom of the tower is 313° absolute. Since an acid containing 56.5% $HNO_3$ is introduced into contact with the gas at the top of tower 8 and as the acid strength increases as the liquid flows downwardly in the tower, a liquid containing substantially 70 parts $HNO_3$ to 30 parts $H_2O$ (70% $HNO_3$) initially contacts was gas containing nitrogen peroxide and chlorine at a point in the tower intermediate between the top and bottom. Substituting appropriate values in the formulae $$\text{I} \quad \frac{(NO_2)^3(Cl_2)^{\frac{1}{2}}(H_2O)}{(NOCl)(HNO_3)^2} = \frac{(0.31)^3(0.166)^{\frac{1}{2}}(0.0092)}{(0.08)(0.0322)^2} = 1.35$$

$$\text{II} \quad (0.02T - 6.6) = 6.26 - 6.6 = -0.34$$
$$\text{antilog}_{(10)} \text{ of } -0.34 = 0.456$$

Since 1.35 is greater than 0.456, the condition with respect to gas composition and reaction temperature are appropriate to produce a concentrated nitric acid containing above 80% $HNO_3$ by the process of this invention from the 56.5% aqueous acid.

The unreacted nitrogen peroxide and chlorine accompanied by nitrosyl chloride formed by reaction of the chlorine leaves the top of tower 8 through pipe 12. Gases from the top of tower 9 pass through a pipe 13 and may be mixed with the gases leaving the top of tower 8 and the mixture treated as desired, for example, as in the process illustrated in Fig. 1, to oxidize the nitrosyl chloride to nitrogen peroxide and chlorine for return to tower 8. If desired, the gases from the top of towers 8 and 9 may be separately withdrawn through pipes 14 and 15 separately treated in any desired manner.

As pointed out above, the reaction of liquefied nitrogen peroxide with an aqueous nitric acid may be promoted by the presence of chlorine in the reaction mixture. In carrying out a process in accordance with this modification of the invention, a mixture of liquefied nitrogen peroxide and chlorine and an aqueous nitric acid containing substantially 70% or more $HNO_3$ are reacted in an autoclave while maintaining the reacting materials at a temperature and pressure at which the nitrogen peroxide and chlorine remain as a liquid. In such a process a large excess of nitrogen peroxide may be employed such that two liquid phases are formed, one of which is a solution in nitric acid of nitrogen peroxide and chlorine and the other a solution in nitrogen peroxide of chlorine and nitric acid. With these two liquid phases present in the reaction mixture, the reacting materials are supplied in amounts such that the partial pressures of $NO_2$, $Cl_2$, $NOCl$, $H_2O$ and $HNO_3$ bear the relationship set forth by the formula $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ and the concentrated nitric acid phase which is formed contains 0.5% or more chlorine calculated at HCl.

Since numerous changes and modifications may be made in the particular processes described above without departing from the scope of the invention, the examples given are to be understood as being illustrative of the invention rather than limiting it.

This application is a continuation-in-part of my copending application Serial No. 697,240, filed November 9, 1933.

I claim:

1. The process for the production of 70% or stronger nitric acid which comprises contacting nitrogen peroxide and chlorine with an aqueous nitric acid containing substantially 70 parts or more $HNO_3$ to 30 parts $H_2O$ in a reaction mixture which comprises a gas phase containing nitrogen peroxide and chlorine in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where: $(NO_2)$, $(Cl_2)$ and $(NOCl)$ are the partial pressures (in atmospheres) of $NO_2$, $Cl_2$ and $NOCl$, respectively, in the gas phase with which the 70% or stronger nitric acid formed by reaction of the nitrogen peroxide with said aqueous nitric acid is last contacted, T is the temperature in degrees absolute of the reaction mixture in which the nitric acid is last contacted with the gas phase, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with said nitrogen peroxide and chlorine and a nitric acid containing at least 70 parts $HNO_3$ to 30 parts $H_2O$ which is more concentrated than said aqueous nitric acid is formed by reaction of said nitrogen peroxide and chlorine with water contained in the aqueous nitric acid.

2. The process for the production of 70% or stronger nitric acid which comprises contacting a gas containing nitrogen peroxide and chlorine with an aqueous nitric acid containing substantially 70 parts or more $HNO_3$ to 30 parts $H_2O$, said gas containing nitrogen peroxide and chlorine in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where: $(NO_2)$, $(Cl_2)$ and $(NOCl)$ are the partial pressures (in atmospheres) of $NO_2$, $Cl_2$ and $NOCl$, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with gas containing nitrogen peroxide and chlorine and a nitric acid containing at least 70 parts $HNO_3$ to 30 parts $H_2O$ which is more concentrated than said aqueous nitric acid is formed by reaction of said nitrogen peroxide and chlorine with water contained in the aqueous nitric acid.

3. The process for the production of 70% or stronger nitric acid which comprises contacting a gas containing 50% or more nitrogen peroxide and chlorine in the proportions of 1 mol of free chlorine for every 1 to 20 mols of nitrogen peroxide with an aqueous nitric acid solution containing substantially 70 parts or more $HNO_3$ to 30 parts $H_2O$, said gas containing nitrogen peroxide, chlorine and nitrosyl chloride in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where: $(NO_2)$, $(Cl_2)$ and $(NOCl)$ are the partial pressures (in atmospheres) of $NO_2$, $Cl_2$ and $NOCl$, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with gas containing nitrogen peroxide and chlorine and a nitric acid containing at least 70 parts HNO₃ to 30 parts H₂O and more than 0.5% chlorine (both free and combined) calculated as HCl and which is more concentrated than said aqueous nitric acid is formed by reaction of said nitrogen peroxide and chlorine with water contained in the aqueous nitric acid.

4. The process for the production of 70% or stronger nitric acid which comprises contacting a gas containing nitrogen peroxide and chlorine with an aqueous nitric acid solution containing substantially 70 parts or more HNO₃ to 30 parts H₂O, said gas containing nitrogen peroxide, chlorine and nitrosyl chloride in amounts such that $$\frac{(NO_2)^3(Cl_2)^{\frac{1}{2}}(H_2O)}{(NOCl)(HNO_3)^2}$$

is at least equal to the antilog₍₁₀₎ of (0.02T—6.6) where: (NO₂), (Cl₂) and (NOCl) are the partial pressures (in atmospheres) of NO₂, Cl₂ and NOCl, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of HNO₃ and H₂O as said aqueous nitric acid containing substantially 70 parts or more HNO₃ to 30 parts H₂O which initially contacts with gas containing nitrogen peroxide and chlorine and nitrosyl chloride and a nitric acid containing at least 70 parts HNO₃ to 30 parts H₂O which is more concentrated than said aqueous nitric acid are formed by reaction of said nitrogen peroxide and chlorine with water contained in said aqueous nitric acid, oxidizing said nitrosyl chloride by means of oxygen, to form nitrogen peroxide and chlorine and reacting the products of said oxidation together with additional nitrogen peroxide with aqueous nitric acid to form concentrated nitric acid by the aforedescribed steps.

5. The process for the production of a concentrated nitric acid which comprises passing a gas containing nitrogen peroxide and chlorine in the proportions of 1 mol chlorine to 3 to 6 mols nitrogen peroxide in contact and in countercurrent flow with an aqueous nitric acid containing about 68% to 74% HNO₃, together with added water which dilutes said aqueous acid, continuing the treatment of the aqueous nitric acid with nitrogen peroxide and chlorine until the resulting concentrated nitric acid contains about 1% chlorine (calculated as HCl) and HNO₃ and water in the same proportions as in a water solution of nitric acid containing about 80% to 90% HNO₃, said gas containing nitrogen peroxide and chlorine in amounts such that $$\frac{(NO_2)^3(Cl_2)^{\frac{1}{2}}(H_2O)}{(NOCl)(HNO_3)^2}$$

is at least equal to the antilog₍₁₀₎ of (0.02T—6.6) where: (NO₂), (Cl₂) and (NOCl) are the partial pressures (in atmospheres) of NO₂, Cl₂ and NOCl, respectively, in the gas with which the acid of 80% to 90% HNO₃ strength formed by reaction of the nitrogen peroxide and chlorine with the aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing 70% HNO₃, fractionally distilling the concentrated nitric acid thus formed to obtain an aqueous nitric acid residue containing about 68% to 74% HNO₃ and a concentrated nitric acid containing about 95% to 100% HNO₃, and treating said aqueous nitric acid residue together with additional water with nitrogen peroxide and chlorine and recovering from the resulting product aqueous nitric acid and concentrated nitric acid by the aforesaid steps.

6. In a process for the production of concentrated nitric acid by reacting nitrogen peroxide and an aqueous nitric acid containing substantially 70 parts or more HNO₃ to 30 parts H₂O to form a nitric acid containing an increased proportion of HNO₃ to H₂O that improvement which comprises reacting said nitrogen peroxide and aqueous nitric acid in a reaction mixture containing concentrations of nitrogen peroxide and nitric acid for which the equilibrium partial pressure of nitric oxide is below 0.01 atmosphere, containing free chlorine in amount sufficient to reduce the partial pressure of nitric oxide of said reaction mixture to below said equilibrium partial pressure and containing said chlorine, nitrogen peroxide and H₂O and HNO₃ in said aqueous nitric acid in proportions resulting in the formation of a nitric acid containing dissolved therein more than 0.5% total chlorine (calculated as HCl).

7. In a process for the production of concentrated nitric acid by reacting nitrogen peroxide and an aqueous nitric acid containing substantially 70 parts or more HNO₃ to 30 parts H₂O to form a nitric acid containing an increased proportion of HNO₃ to H₂O that improvement which comprises reacting said nitrogen peroxide and aqueous nitric acid in a reaction mixture containing concentrations of nitrogen peroxide and nitric acid for which the equilibrium partial pressure of nitric oxide is below 0.01 atmosphere, said reaction mixture containing in the liquid phase thereof 1 mol of free chlorine to 5 to 100 mols of nitrogen peroxide to reduce the partial pressure of nitric oxide of the reaction mixture to below said equilibrium partial pressure and containing said chlorine, nitrogen peroxide and H₂O and HNO₃ in said aqueous nitric acid in proportions resulting in the formation of a nitric acid containing dissolved therein about 1% or more total chlorine (calculated as HCl).

8. The process for the production of concentrated nitric acid which comprises contacting nitrogen peroxide and chlorine with an aqueous nitric acid containing substantially 70 parts or more HNO₃ to 30 parts H₂O in a reaction mixture which comprises a gas phase containing nitrogen peroxide and chlorine in amounts such that $$\frac{(NO_2)^3(Cl_2)^{\frac{1}{2}}(H_2O)}{(NOCl)(HNO_3)^2}$$

is at least equal to the antilog₍₁₀₎ of (0.02T—6.6) where: (NO₂), (Cl₂) and (NOCl) are the partial pressures (in atmospheres) of NO₂, Cl₂ and NOCl, respectively, in the gas phase with which the 70% or stronger nitric acid formed by reaction of the nitrogen peroxide with said aqueous nitric acid is last contacted, T is the temperature in degrees absolute of the reaction mixture in which the nitric acid is last contacted with the gas phase, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with said nitrogen peroxide and chlorine and a nitric acid containing at least 70 parts $HNO_3$ to 30 parts $H_2O$ which is more concentrated than said aqueous nitric acid is formed by reaction of said nitrogen peroxide and chlorine with water contained in the aqueous nitric acid, fractionally distilling the concentrated nitric acid thus formed to obtain an aqueous nitric acid residue and a more concentrated nitric acid and treating said aqueous nitric acid residue with nitrogen peroxide and chlorine and recovering from the resulting product aqueous nitric acid and concentrated nitric acid by the aforesaid steps.

9. The process for the production of 70% or stronger nitric acid which comprises contacting a gas containing nitrogen peroxide and chlorine in the proportions of 1 mol of free chlorine for every 1 to 20 mols of nitrogen peroxide with an aqueous nitric acid solution containing substantially 70 parts or more $HNO_3$ to 30 parts $H_2O$, said gas containing nitrogen peroxide, chlorine and nitrosyl chloride in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where: $(NO_2)$, $(Cl_2)$ and $(NOCl)$ are the partial pressures (in atmospheres) of $NO_2$, $Cl_2$ and $NOCl$, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with gas containing nitrogen peroxide and chlorine and a nitric acid containing at least 70 parts $HNO_3$ to 30 parts $H_2O$ which is more concentrated than said aqueous nitric acid is formed by reaction of said nitrogen peroxide and chlorine with water contained in the aqueous nitric acid.

10. The process for the production of 70% or stronger nitric acid which comprises contacting a gas containing nitrogen peroxide and chlorine in the proportions of 1 mol of free chlorine for every 3 to 6 mols of nitrogen peroxide with an aqueous nitric acid solution containing substantially 70 parts or more $HNO_3$ to 30 parts $H_2O$, said gas containing nitrogen peroxide, chlorine and nitrosyl chloride in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where $(NO_2)$, $(Cl_2)$ and $(NOCl)$ are the partial pressures (in atmospheres) of $NO_2$, $Cl_2$ and $NOCl$, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with gas containing nitrogen peroxide and chlorine and a nitric acid containing at least 70 parts $HNO_3$ to 30 parts $H_2O$ which is more concentrated than said aqueous nitric acid is formed by reaction of said nitrogen peroxide and chlorine with water contained in the aqueous nitric acid.

11. The process for the production of 70% or stronger nitric acid which comprises contacting a gas containing nitrogen peroxide and chlorine in the proportions of 1 mol of free chlorine for every 3 to 6 mols of nitrogen peroxide with an aqueous nitric acid solution containing substantially 70 parts or more $HNO_3$ to 30 parts $H_2O$, said gas containing nitrogen peroxide, chlorine and nitrosyl chloride in amounts such that $$\frac{(NO_2)^3(Cl_2)^{\frac{1}{2}}(H_2O)}{(NOCl)(HNO_3)^2}$$

is at least equal to the antilog$_{(10)}$ of $(0.02T-6.6)$ where: $(NO_2)$, $(Cl_2)$ and $(NOCl)$ are the partial pressures (in atmospheres) of $NO_2$, $Cl_2$ and $NOCl$, respectively, in the gas with which the 70% or stronger nitric acid formed by reaction of the nitrogen peroxide with said aqueous nitric acid is last contacted, T is the temperature in degrees absolute of the gas and nitric acid where the nitric acid is last contacted with the gas, and $$\frac{(H_2O)}{(HNO_3)^2}$$

is the ratio of the water vapor pressure to the square of the nitric acid vapor pressure at temperature T over a nitric acid-water solution containing the same proportions of $HNO_3$ and $H_2O$ as said aqueous nitric acid containing substantially 70 parts or more $HNO_3$ to 30 parts $H_2O$ which initially contacts with gas containing nitrogen peroxide and chlorine and a nitric acid containing at least 70 parts $HNO_3$ to 30 parts $H_2O$ and more than 1% chlorine (both free and combined) calculated as HCl and which is more concentrated than said aqueous nitric acid is formed by reaction of said nitrogen peroxide and chlorine with water contained in the aqueous nitric acid.

HERMAN A. BEEKHUIS, Jr.

CERTIFICATE OF CORRECTION.

Patent No. 2,185,580. January 2, 1940.

HERMAN A. BEEKHUIS, JR.

It is hereby certified that error appears in the printed specification of the above numbered patent requiring correction as follows: Page 1, first column, line 34, for "dimitation" read limitation; page 4, first column, line 27, for "nitrozen" read nitrogen; line 53 and second column, line 4 second occurrence, for "chloride" read chlorine; line 56, for "was" read with; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.